US006932862B2

(12) United States Patent
Daugherty

(10) Patent No.: US 6,932,862 B2
(45) Date of Patent: Aug. 23, 2005

(54) HIGH TEMPERATURE COATING COMPOSITION AND METHOD OF APPLYING

(75) Inventor: Timothy L. Daugherty, Englewood, TN (US)

(73) Assignee: Maytag Corporation, Newton, IA (US)

( * ) Notice: Subject to any disclaimer, the term of this patent is extended or adjusted under 35 U.S.C. 154(b) by 188 days.

(21) Appl. No.: 09/995,754

(22) Filed: Nov. 29, 2001

(65) Prior Publication Data

US 2003/0099775 A1 May 29, 2003

(51) Int. Cl.[7] .............................................. C09D 183/04
(52) U.S. Cl. .................. 106/287.14; 524/588; 524/406; 524/407; 524/413; 524/404; 524/428; 524/435; 524/437; 524/442; 428/447; 219/391; 432/120
(58) Field of Search ................................ 524/588, 406, 524/407, 404, 413, 428, 435, 437, 442; 106/287.14; 428/447; 219/391; 432/120

(56) References Cited

U.S. PATENT DOCUMENTS

| | | | |
|---|---|---|---|
| 3,928,668 A | 12/1975 | Snow | |
| 4,048,473 A | 9/1977 | Burkhart | |
| 4,120,981 A | 10/1978 | Burkhart | |
| 4,696,700 A | 9/1987 | Fischer et al. | |
| 4,859,506 A | 8/1989 | Puchinger et al. | |
| 5,250,112 A * | 10/1993 | Wussow et al. ............ 106/453 | |
| 5,252,125 A | 10/1993 | Speer et al. | |
| 5,254,162 A | 10/1993 | Speer et al. | |
| 5,260,364 A * | 11/1993 | Johnson ...................... 524/413 |
| 5,455,080 A | 10/1995 | van Ooij | |
| 5,834,067 A | 11/1998 | Rodely | |
| 5,965,983 A * | 10/1999 | Bouwkamp-Wijnoltz et al. .......................... 313/635 |
| 6,034,178 A * | 3/2000 | Decker et al. .............. 525/101 |
| 6,080,232 A | 6/2000 | Sperlich et al. | |
| 6,087,438 A * | 7/2000 | Herber et al. ............... 524/588 |
| 6,180,726 B1 * | 1/2001 | Eklund et al. .............. 525/408 |

FOREIGN PATENT DOCUMENTS

| | | |
|---|---|---|
| JP | 57-107271 | 7/1982 |
| JP | 59-100170 | 6/1984 |
| JP | 63-270771 | 11/1988 |

\* cited by examiner

Primary Examiner—Margaret G. Moore
(74) Attorney, Agent, or Firm—Diederiks & Whitelaw, PLC; Allan P. Orsund

(57) ABSTRACT

A high temperature resistive coating composition includes a pigmenting component, a binder component, and a hardening agent. The pigmenting component includes a spinel of the formula $AB_2O_4$, in which A is selected from the group consisting of Mg, Fe, Zn, Mn, Cu and Ni, or a combination thereof, and B is selected from the group consisting of Al, Fe and Cr, or a combination thereof. The binder component of the high temperature resistive coating is preferably a polysiloxane material, such as a silicon resin. Moreover, the hardening agent of the high temperature resistive coating includes a finely powdered material selected from the group consisting of diamond powder, BN, WC, SiC, $Al_2O_3$, AlN and $SiO_2$. The resistive coating may be advantageously used for coating the interior of a self-cleaning oven, an oven rack, burner grates, and the like, particularly due to its ability to withstand high temperatures.

36 Claims, 2 Drawing Sheets

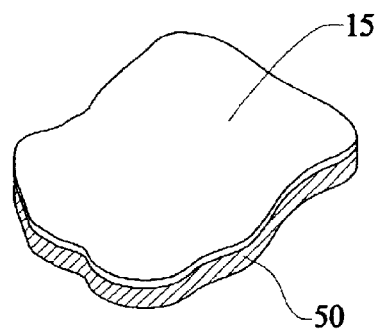
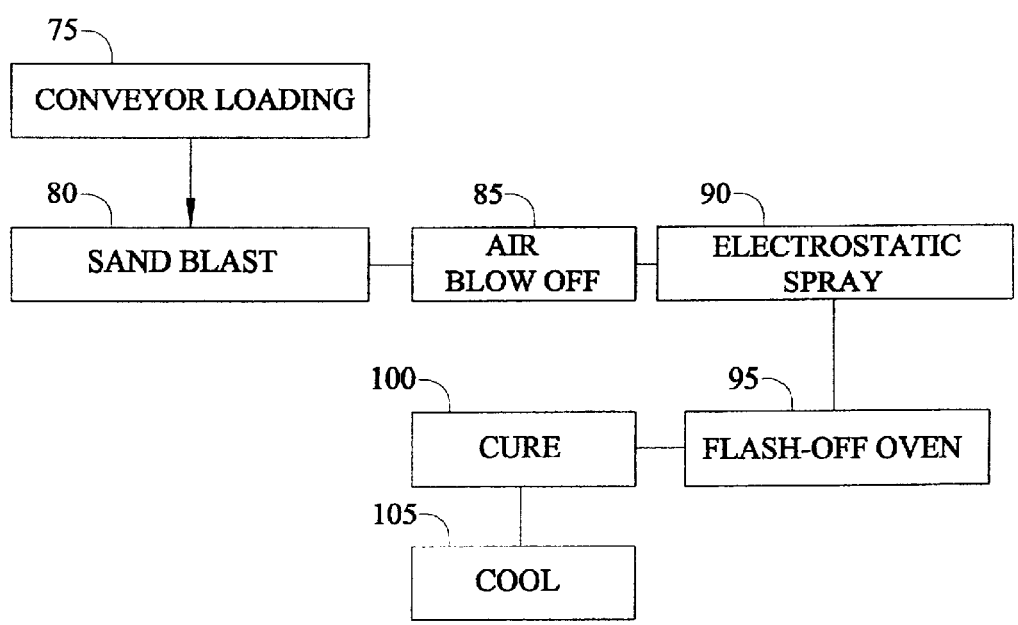

HIGH TEMPERATURE COATING COMPOSITION AND METHOD OF APPLYING

BACKGROUND OF THE INVENTION

1. Field of the Invention

The present invention relates to the art of protective coatings for high temperature environments and methods of applying the protective coatings, particularly to an interior surface of a domestic oven.

2. Discussion of the Prior Art

It is widely known to form domestic ovens from metal and to coat the interior metallic surfaces of the domestic ovens with compositions to protect against corrosion, high temperature effects and the like. The compositions are often chosen based on their ease of cleaning. However, the choice of compositions has been severely limited, mainly because these compositions must be stable at elevated temperatures. Because many domestic ovens today include self-clean cycles, which use temperatures typically over 700° F. (370° C.), the coatings must be resistant to temperatures well above the self-clean cycle temperatures. In general, such coatings have been essentially limited to ceramic/porcelain materials.

Ceramic coatings are known to be expensive and can be difficult to apply to substrate, i.e., the application of ceramic materials to the interior surfaces of domestic ovens can be problematic. For example, one method of applying ceramic coatings to substrate is the electrostatic application of wet porcelain suspensions. In this method, an electrostatic charge is applied to droplets of the porcelain suspension. A cloud of the charged droplets is then sprayed on the substrate. The charges on the droplets are immediately dissipated when they strike the substrate. Therefore, only the Theological character of the porcelain suspension causes the droplets to remain in place on the substrate. This makes it difficult to move the substrate without disturbing the porcelain suspension. Another method of applying ceramic coatings is the application of dry ceramic powders. This method also has problems, including the difficulty of shifting the substrate so that the powder does not partially or entirely flake and fall free from the substrate. Since chipped or fractured areas are more prone to corrosion, avoiding this problem is necessary. Based on the above, the application of ceramic coatings is complicated and not extremely economic.

Due to the problems with ceramic coatings and the lack of alternatives that can withstand extreme temperatures, as well as other necessary functional characteristics, there exists a need for a novel, thermally stable coating composition and an effective method of applying such a composition to substrates such as domestic ovens.

SUMMARY OF THE INVENTION

The invention is directed to a high temperature resistive coating composition and method of applying the coating to a substrate. More specifically, the coating composition comprises a pigmenting component, a binder component, and a hardening agent. The pigmenting component includes a spinel of the formula $AB_2O_4$, in which A is selected from the group consisting of Mg, Fe, Zn, Mn, Cu and Ni, or a combination thereof, and B is selected from the group consisting of Al, Fe and Cr, or a combination thereof. In addition, the spinel of the pigmenting agent may be in solution with an aqueous acid, such as chromic acid, phosphoric acid, or a combination thereof. Further, the pigmenting component may include a water-soluble crosslinking agent for crosslinking silicone resins. The binder component of the high temperature resistive coating is preferably a polysolixane material, such as silicon resin. Moreover, the hardening agent of the high temperature resistive coating includes a finely powdered material selected from the group consisting of diamond powder, BN, WC, SiC, $Al_2O_3$, AlN and $SiO_2$.

The method of applying the coating composition of the invention to a substrate, for example, the interior of an oven, includes: (1) sand blasting the interior surface of the oven; (2) passing the substrate through an air blow-off station; (3) electrostatically spraying the coating composition on the substrate; (4) passing the coated substrate through a flash-off oven; and (5) curing the coating onto the substrate. The resistive coating can be advantageously used for coating the interior of a self-cleaning oven, oven racks, burner grates of a gas cooking appliance, and the like due to the ability of the coating to withstand high temperatures.

Additional objects, features and advantages of the invention will become more readily apparent from the following detailed description of a preferred embodiment of the invention, when taken in conjunction with the drawings wherein like reference numerals refer to corresponding elements in the several views.

BRIEF DESCRIPTION OF THE DRAWINGS

FIG. 2 is a partial, cross-sectional view of the coating composition of the invention applied to a substrate; and FIG. 3 is a diagrammatic representation of a preferred method of applying the coating composition of the invention to a substrate.

DETAILED DESCRIPTION OF THE PREFERRED EMBODIMENT

Figure 1:
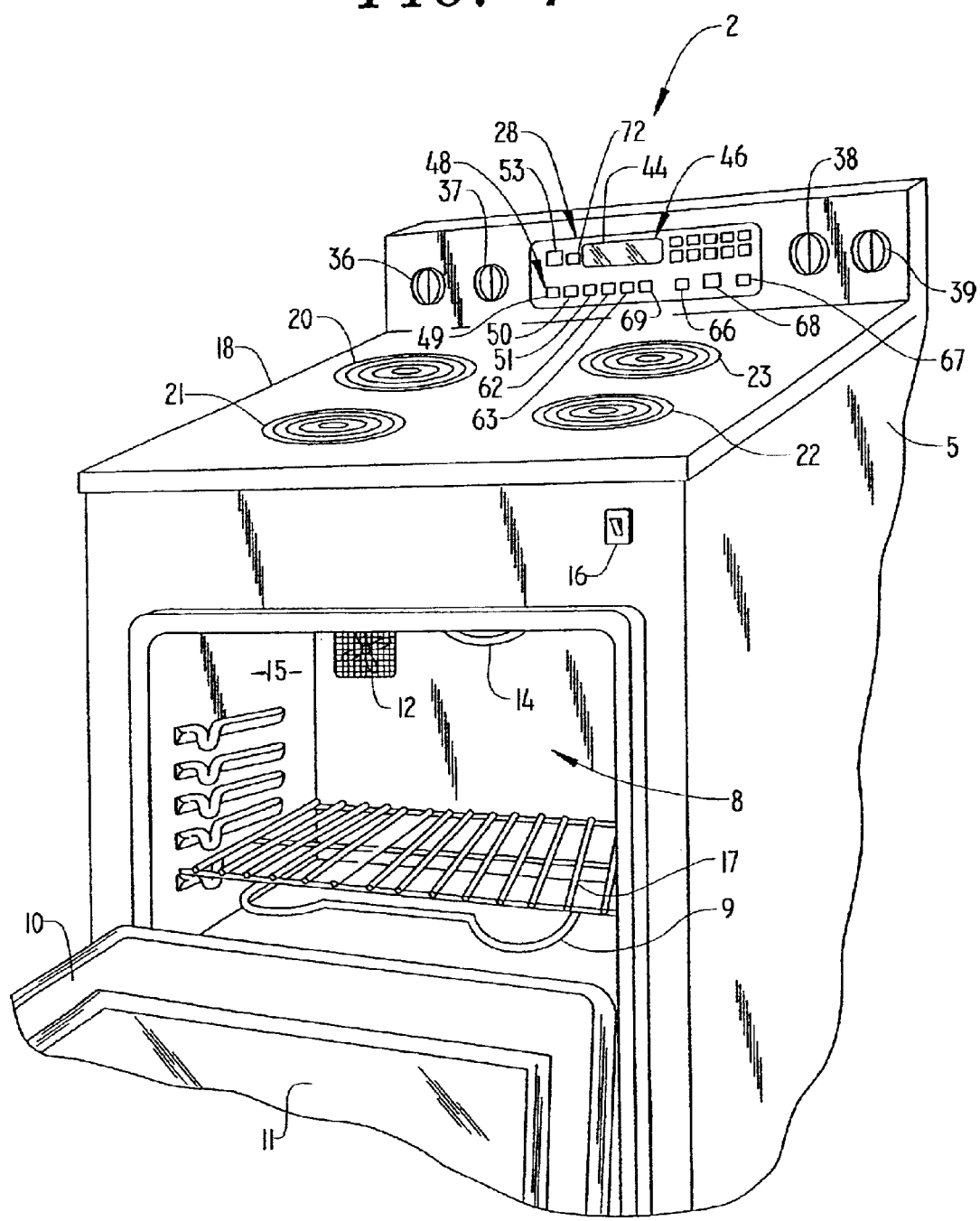
FIG. 1 is a partial perspective view of an electric range including an oven cavity coated with a high-temperature resistant composition according to the invention.

With initial reference to FIG. 1, the invention is illustrated for use in connection with an electric range, generally indicated at 2. In the embodiment shown, electric range 2 includes a cabinet 5 within which is arranged an oven cavity 8 having an associated lower heating element 9 and a door 10 shown in an open condition wherein access to oven cavity 8 is permitted. An upper heating element 14 is also provided in oven cavity 8, such as for broiling operations as widely known in the art. Heating elements 9 and 14 are shown of a conventional electric heating element design, however, heating elements 9 and 14 may be constituted by gas heating elements or of any other conventional designs. This figure also illustrates the presence of a viewing window 11 in door 10. Furthermore, within oven cavity 8, a fan 12 is provided. In a manner known in the art, cabinet 5 is provided with a light switch 16 which functions to turn on a light (not shown) within oven cavity 8 upon the opening of door 10. For purposes of describing the invention, reference will be made to applying the high-temperature resistive coating of the invention on the interior surface of oven cavity 8 as generally indicated 15. However, as will be fully recognized after reading this description, coating 15 could be equally applied to other parts of range 2, including a movable oven rack such as that generally indicated at 17 in FIG. 1.

Cabinet 5 is also provided with an associated range top 18, which supports various spaced surface heating elements 20–23 in a manner known in the art. At an upper rear portion, cabinet 5 is provided with a control panel 28. Control panel 28 includes a plurality of knobs 36–39 for use in selectively activating and deactivating surface heating elements 20–23 respectively. In addition, control panel 28 is shown to include a central display 44, such as an LED or LCD display unit. Furthermore, control panel 28 is provided with a number pad generally indicated at 46 having buttons for the numbers zero (0) through nine (9), with the zero (0) button also functioning as a reset control button.

Although the particular features incorporated into electric range 2 and control panel 28 could vary greatly within the scope of the present invention, for the sake of completeness in describing a preferred form of the invention, control panel 28 of range 2 is also shown to include a lower row of control buttons generally indicated at 48 which are provided to select various operational modes for range 2. For instance, the row of control buttons 48 can be used to select bake, broil and clean modes for range 2 through respective buttons 49–51. In the particular embodiment shown, an additional convection-baking mode, which is essentially defined by a baking mode with the further activation of fan 12, can also be selected through button 53. In another form of the invention, the user may program the operation of range 2 with the lower row of control buttons 48; control button 53 and numeric pad 46, as well as timer buttons 62 and 63. Furthermore, buttons 66 and 67 are provided to enable a consumer to set desired countdown and clock times, in combination with numeric pad 46, respectively. Button 68 performs a stop or clear control function, while button 69 enables a consumer to turn on the light within oven cavity 8 without opening door 10 such that oven cavity 8 can be selectively viewed through window 11.

At this point, it should be realized that range 2 is being presented to provide an example of the potential application of the coating composition 15 of the invention. Therefore, it should be recognized that the invention is equally applicable to a wide range of cooking and other appliances, as well as in other fields where the attributes of the coating composition can be advantageously exploited. In any event, additional, potential applications of the invention will become readily apparent from the remaining description.

The coating composition 15 of the invention includes three main components: a pigmenting component, a binder component, and a hardening agent. The first component is the pigmenting component, which is a suspension essentially including a spinel in an aqueous acid solution. More specifically, inorganic bright colored pigments are derived from crystallographic grouping of spinels. Specifically, the spinel is of the formula $AB_2O_4$, where A is an element in its divalent form, preferably Mg, Fe, Mn, Cu or Ni; and B is an element in its trivalent form, preferably Al, Fe or Cr. Most preferably, the spinel has the formula of $CuCr_2O_4$. The aqueous acid solution preferably includes chromic acid or phosphoric acid, or a combination thereof, and is of such volume to cause the pigmenting component to exhibit a pH of approximately 1.0 and, preferably, less than 1.0. In accordance with the most preferred embodiment of the invention, the spinel forms between 25 and 75% of the total pigmenting component and the acid forms 75–25% of the pigmenting component. The pigmenting component also preferably includes a crosslinking agent, generally in the range of 2–10%. The crosslinking agent is water-soluble and is specifically chosen to interact with the constitution of the binding component, to be later described.

In addition, metal oxides may be added to the pigmenting component in order to tailor the physical properties of the final coating composition 15. Oxides such as MgO, CuO, $Cr_2O_3$, FeO, $FeO_2$, $Fe_2O_3$, ZnO, and MnO, are representative oxides although, depending upon the final properties of the high-temperature resistant coating composition 15 desired, other metal oxides may be incorporated. In essence, the metal oxides effectively contribute to the hardness of the coating. Additionally, modifying agents, such as surfactants, dispersants and/or emulsifiers may be added to alter the properties of the pigmenting component and/or the final coating composition 15.

The second part of the high-temperature resistant coating composition 15 is the binder component. Preferably, the binder component is a polysiloxane material, such as a silicone resin. Silicone resin is preferred due to its unique set of physical parameters that are useful in forming a high temperature resistive coating. More preferably, the silicone resin has a methyl to phenyl ratio between 30:70 and 70:30. Dow Coerning 805, IIV-490, 431 HS and 409HS are examples of such silicone resins. An organic solvent, in a 1:1 ratio, is included. Various organic solvent may be used, for example, xylene, toluene/isopropanol, ketones, esters, hydrocarbons, chlorinated solvents, or any mixture thereof.

The final main ingredient of the high-temperature resistant coating composition 15 is the hardening agent. The function of the hardening agent is to cross-link with the binder component to produce an abrasion resistant finish. Preferable hardening agents are diamond powder, cBN, hBN, WC, SiC , $Al_2O_3$, AlN and $SiO_2$, however, a wider range of hardening agents could be employed. The hardening agents should be finely powdered, preferably to a particle size of 1200 grit or finer.

In one preferred form of the invention, the pigmenting component, the binder component and the hardening agent are provided in a ratio of one liter to one liter to 100–200 grams, respectively. The high-temperature resistive coating composition 15 is liquid at room temperature and preferably applied to a substrate 50, such as the walls of oven cavity 8, via a specific procedure. Before the process can begin, the substrate 50 is to be cleaned of oil, grease and any other contaminants that could hinder the coating process.

In accordance with the most preferred form of the invention, the substrate 50, e.g. interior walls of oven cavity 8, oven racks, burner grates, or the like, to be treated is positioned on a conveyer in step 75 (see FIG. 3) in order to be transported throughout various application stages. A spindle type conveyer can be advantageously used depending on the shape of the particular substrate 50 or part. Considered advantageous, particularly in connection with coating at least oven racks, such as rack 17 and/or burner grates, is the use of an overhead omega loop conveyor. First, the substrate 50 is transported through an automatic sand blaster (step 80). Preferably, 100 grit aluminum oxide is used as the blasting media, with the pressure being set between about 80 and 90 psi. Next, the substrate 50 is transported through an air blow-off station (step 85) to remove any excess media remaining from sand blast step 80. The substrate 50 is then transported through an automatic spray booth (step 90) where the coating composition 15 is applied, preferably with electrostatic wet spray equipment at high pressure and low volume. An electrostatic turbo disk reciprocator using a 6-inch (15.25 cm) conical disk spinning at approximately 20,000 rpm can be advantageously utilized. Other electrostatic wet spray equipment could also be employed, such as a gun preferably with an 0.8 mm to 1.0 mm tip. In one preferred embodiment, composition 15 is applied at a thickness of 0.8 mm to 2.5 mm by one single pass coat at a conveyor speed of approximately 12 ft/min (3.7 m/min). Following the coating of substrate 50, substrate 50 is transported into a flash-off oven (step 95) preferably set at 105–125° F. (40°–50° C.). Substrate 50 preferably remains in the flash-off oven in the order of 15–25 minutes, depending on the exact formula of the composition 15 used. Following the flash-off period, coating composition 15 is cured (step 100), such as in an oven at 650–750° F., (340°–400° C.) for 1–1.5 hours. A lower temperature for a longer period could also be employed. For instance, a temperature of about 400° F. (204° C.) for approximately 4 hours could also be utilized. Thereafter, substrate 50 is ready for use after undergoing a cooling period (step 105).

Although described with reference to a preferred embodiment of the invention, it should be readily understood that various changes and/or modifications can be made to the invention without departing from the spirit thereof. For instance, although the invention has been described with respect to coating oven cavity 8 of range 2, it should be readily apparent that the invention has applicability to various types of appliances, including other cooking units, as well as appliance components such as oven racks, burner grates and the like. Since the coating composition 15 exhibits the ability to withstand extremely high temperatures, various other fields of uses are also available including, but not limited to, the automotive field. In addition to high temperature resistance, coating composition 15 of the present invention has been found to have high resistance to abrasion and chipping. The coating composition 15 is also economically advantageous as compared to other known coatings such as porcelain. In any event, the invention is only intended to be limited by the scope of the following claims.

I claim:

1. A high temperature resistive coating composition comprising:
    a pigmenting component including a spinel;
    a binder component including a silicone resin and an organic solvent, wherein said organic solvent and said silicone resin are present in a substantially 1:1 ratio by volume; and
    a hardening agent.
2. The high temperature resistive coating composition of claim 1, wherein said spinel of said pigmenting component is of the formula $AB_2O_4$, in which
    A is selected from the group consisting of Mg, Fe, Zn, Mn, Cu, Ni and combinations thereof, and
    B is selected from the group consisting of Al, Fe, Cr and combinations thereof.
3. The high temperature resistive coating composition of claim 2, wherein said spinel has a formula of $CuCr_2O_4$.
4. The high temperature resistive coating composition of claim 1, further comprising a metal oxide.
5. The high temperature resistive coating composition of claim 1, further comprising at least one modifying agent selected from the group consisting of surfactants, dispersants and emulsifiers.
6. The high temperature resistive coating composition of claim 1, wherein the silicone resin of said binder component is a polysiloxane.
7. The high temperature resistive coating composition of claim 1, wherein the silicone resin has a methyl to phenyl ratio of between 30:70 and 70:30.
8. The high temperature resistive coating composition of claim 1, wherein said hardening agent is constituted by a finely powdered material selected from the group consisting of diamond powder, BN, WC, SiC, $Al_2O_3$, AlN and $SiO_2$.
9. The high temperature resistive coating composition of claim 1, wherein said composition is a liquid at room temperature.
10. The high temperature resistive coating composition of claim 9, wherein said pigmenting component, said binder component and said hardening agent are provided in a ratio of one liter to one liter to 100–200 grams, respectively.
11. A high temperature resistive coating composition comprising:
    a pigmenting component including a spinel, wherein said pigmenting component is a solution of said spinel in an aqueous acid;
    a binder component including a silicone resin; and
    a hardening agent.
12. The high temperature resistive coating composition of claim 11, wherein said pigmenting component has a pH less than 1.0.
13. The high temperature resistive coating composition of claim 11, wherein said acid is selected from the group consisting of chromic acid, phosphoric acid, and a combination thereof.
14. The high temperature resistive coating composition of claim 13, wherein said pigmenting component has a pH less than 1.0.
15. The high temperature resistive coating composition of claim 11, wherein said pigmenting component contains 25–75% spinel and 75–25% acid by volume.
16. The high temperature resistive coating composition of claim 11, wherein said pigmenting component further includes a water-soluble crosslinking agent for crosslinking the silicone resin.
17. The high temperature resistive coating composition of claim 16, wherein said crosslinking agent forms 2–10% by volume of said pigmenting component.
18. The high temperature resistive coating composition of claim 11, wherein said binder component further includes an organic solvent.
19. A high temperature resistive coating composition comprising:
    a pigmenting component including a spinel;
    a binder component including a silicone resin; and
    a hardening agent, wherein said hardening agent is a finely powdered material having a formula of SiC.
20. A cooking appliance comprising:
    an oven cavity having an interior surface;
    a heating element for heating said oven cavity;
    a rack arranged in the oven cavity; and
    a high temperature resistive coating composition arranged on at least one of the interior surface of said oven cavity and said rack, said high temperature resistive coating composition being formed from:
    a pigmenting component including a spinel;
    a binder component including a silicone resin; and
    a hardening agent, wherein said spinel of said pigmenting component is of the formula $AB_2O_4$, in which
    A is selected from the group consisting of Mg, Fe, Zn, Mn, Cu, Ni, and combinations thereof, and;
    B is selected from the group consisting of Al, Fe, Cr and combinations thereof.
21. The cooking appliance of claim 20, wherein said spinel has a formula of $CuCr_2O_4$.
22. The cooking appliance of claim 20, wherein the coating composition includes a metal oxide.
23. A cooking appliance comprising:
    an oven cavity having an interior surface
    a heating element for heating said oven cavity a rack arranged in the oven cavity; and a high temperature resistive coating composition arranged on at least one of the interior surface of said oven cavity and said rack, said high temperature resistive coating composition formed from:
- a pigmenting component including a spinel;
- a binder component including a silicone resin; and
- a hardening agent, wherein the coating composition further comprises at least one modifying agent selected from the group consisting of surfactants, dispersants and emulsifiers.

24. The cooking appliance of claim 20, wherein the silicone resin of said binder component is a polysiloxane.

25. The cooking appliance of claim 20, wherein the silicone resin has a methyl to phenyl ratio of between 30:70 and 70:30.

26. A cooking appliance comprising:

an oven cavity having an interior surface;

a heating element for heating said oven cavity;

a rack arranged in the oven cavity; and a high temperature resistive coating composition arranged on at least one of the interior surface of said oven cavity and said rack, said high temperature resistive coating composition formed from:
- a pigmenting component including a spinel;
- a binder component including a silicone resin; and
- a hardening agent, wherein said hardening agent is constituted by a finely powdered material selected from the group consisting of diamond powder, BN, WC, SiC, $Al_2O_3$, AlN and $SiO_2$.

27. A cooking appliance comprising:

an oven cavity having an interior surface;

a heating element for heating said oven cavity;

a rack arranged in the oven cavity; and a high temperature resistive coating composition arranged on at least one of the interior surface of said oven cavity and said rack, said high temperature resistive coating composition being formed from:
- a pigmenting component including a spinel;
- a binder component including a silicone resin; and
- a hardening agent, wherein said hardening agent is a finely powdered material having a formula of SiC.

28. A cooking appliance comprising:

an oven cavity having an interior surface;

a heating element for heating said oven cavity;

a rack arranged in the oven cavity; and a high temperature resistive coating composition arranged on at least one of the interior surface of said oven cavity and said rack, said high temperature resistive coating composition being formed from:
- a pigmenting component including a spinel, wherein said pigmenting component is a solution of said spinel in an aqueous acid;
- a binder component including a silicone resin; and
- a hardening agent.

29. The cooking appliance of claim 28, wherein said pigmenting component has a pH less than 1.0.

30. The cooking appliance of claim 28, wherein said acid is selected from the group consisting of chromic acid, phosphoric acid, and a combination thereof.

31. The cooking appliance of claim 30, wherein said pigmenting component has a pH less than 1.0.

32. The cooking appliance of claim 28, wherein said pigmenting component contains 25–75% spinel and 75–25% acid by volume.

33. The cooking appliance of claim 28, wherein said pigmenting component further includes a water-soluble crosslinking agent for crosslinking the silicone resin.

34. The cooking appliance of claim 33, wherein said crosslinking agent forms 2–10% by volume of said pigmenting component.

35. A cooking appliance comprising:

an oven cavity having an interior surface;

a heating element for heating said oven cavity;

a rack arranged in the oven cavity; and a high temperature resistive coating composition arranged on at least one of the interior surface of said oven cavity and said rack, said high temperature resistive coating composition being formed from:
- a pigmenting component including a spinel;
- a binder component including a silicone resin, wherein said binder component further includes an organic solvent; and
- a hardening agent, wherein said pigmenting component, said binder component and said hardening agent are provided in a ratio of one liter to one liter to 100–200 grams, respectively.

36. The cooking appliance of claim 35, wherein said organic solvent and said silicone resin are present in a substantially 1:1 ratio by volume.

* * * * *